(12) United States Patent
Kim

(10) Patent No.: US 11,735,973 B2
(45) Date of Patent: Aug. 22, 2023

(54) INTEGRATED MOTOR COVER WITH BEARING AND HEAT DISSIPATION MEMBER

(71) Applicant: HYUNDAI MOBIS CO., LTD., Seoul (KR)

(72) Inventor: Il Ryong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 107 days.

(21) Appl. No.: 17/307,146

(22) Filed: May 4, 2021

(65) Prior Publication Data

US 2021/0351656 A1    Nov. 11, 2021

(30) Foreign Application Priority Data

May 6, 2020    (KR) .......................... 10-2020-0053749

(51) Int. Cl.
*H02K 5/08*  (2006.01)
*H02K 5/173* (2006.01)
*H02K 9/22*  (2006.01)
*H02K 5/22*  (2006.01)
*H02K 7/08*  (2006.01)

(52) U.S. Cl.
CPC .............. *H02K 5/08* (2013.01); *H02K 5/173* (2013.01); *H02K 5/22* (2013.01); *H02K 5/225* (2013.01); *H02K 7/08* (2013.01); *H02K 9/227* (2021.01)

(58) Field of Classification Search
CPC ............ H02K 5/08; H02K 5/173; H02K 5/22; H02K 7/08; H02K 9/227; H02K 5/225; H02K 7/14; H02K 5/04; H02K 5/16; Y02P 80/30
See application file for complete search history.

(56) References Cited

U.S. PATENT DOCUMENTS

| 5,138,208 A * | 8/1992 | Kondo .................. H02K 5/08 |
| | | 310/43 |
| 5,761,646 A * | 6/1998 | Frid-Nielsen .... G06Q 10/06314 |
| | | 715/769 |
| 2019/0090925 A1* | 3/2019 | Detweiler .......... A61B 17/8076 |

FOREIGN PATENT DOCUMENTS

| KR | 10-2015-0020753 A | 2/2015 | |
| KR | 2017042396 A * | 4/2017 | ............... H02K 5/04 |

OTHER PUBLICATIONS

KR20170042396A English translation (Year: 2022).*

* cited by examiner

*Primary Examiner* — Christopher M Koehler
*Assistant Examiner* — Viswanathan Subramanian
(74) *Attorney, Agent, or Firm* — NSIP Law

(57) ABSTRACT

A motor device may include: a motor housing including a mounting hole; a motor cover mounted on the motor housing, and including a connection hole facing the mounting hole; a coupling member inserted into the mounting hole and the connection hole, and mounted in the mounting hole and the connection hole; and a fastening member coupled to a main housing through the coupling member.

14 Claims, 7 Drawing Sheets

INTEGRATED MOTOR COVER WITH BEARING AND HEAT DISSIPATION MEMBER

CROSS-REFERENCE TO RELATED APPLICATION

This application claims the benefit under 35 U.S.C. § 119(a) of Korean Patent Application No. 10-2020-0053749 filed on May 6, 2020 in the Korean Intellectual Property Office, the entire disclosure of which is incorporated herein by reference for all purposes.

BACKGROUND

Field

Exemplary embodiments of the present disclosure relate to a motor device, and more particularly, to a motor device which is manufactured through insert molding and thus has an improved heat radiation characteristic.

Discussion of the Background

In general, a motor refers to a mechanical device capable of acquiring a rotational force from electrical energy, and includes a stator and a rotor. The rotor may be configured to electromagnetically interact with the stator, and rotated by a force acting between a magnetic field and a current flowing through a coil.

The motor includes a plurality of housings and a cover, which forms the exterior of the motor, and the cover is fastened to the housings while supporting a rotating shaft of the motor.

In the motor according to the related art, the cover requires a complex shape, and a manufacturing method which can be applied to the cover is limited. In consideration of the weight and rigidity of the motor, the cover is mostly formed of aluminum, and usually manufactured through gravity casting or die casting. However, the material of the cover is lost at a high rate during the casting, and the cover requires finishing and post-processing to thereby increase the price of a product. Therefore, there is a need for a device capable of solving the problem.

The related art of the present disclosure is disclosed in Korean Patent Application Laid-Open No. 10-2015-0020753 published on Feb. 27, 2015 and entitled "Cooling and Oil Churning Rotor Structure for Induction Motor".

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a motor device includes: a motor housing including a mounting hole; a motor cover mounted on the motor housing, and including a connection hole facing the mounting hole; a coupling member inserted into the mounting hole and the connection hole, and mounted in the mounting hole and the connection hole; and a fastening member coupled to a main housing through the coupling member.

The motor cover may include: a bearing part configured to rotatably support a motor shaft; a heat radiation part disposed outside of the bearing part and configured to transfer heat from the motor housing to the main housing; and a mold cover integrated with the bearing part and the heat radiation part.

The mold cover may be an injection-molded member.

The bearing part and the heat radiation part may be housed in the mold cover.

The mold cover may include a plurality of cover portions, and the bearing part and the heat radiation part may be disposed between the plurality of cover portions.

The bearing part and the heat radiation part may each be formed of a metallic material. The mold cover may be formed of a plastic material.

The heat radiation part may include: a heat radiation body having a disk shape of which a center is open; a first protrusion protruding from the heat radiation body toward the motor housing, and abutting on the motor housing; and a second protrusion protruding from the heat radiation body toward the main housing, and abutting on the main housing.

The mold cover may include: a first cover disposed between the bearing part and the heat radiation body so as to integrate the bearing part and the heat radiation body; a second cover configured to cover an outer surface of the first protrusion; and a third cover configured to cover an inner surface of the second protrusion.

The mounting hole may be located at an edge of the motor housing. The connection hole may be located at an edge of the mold cover.

The coupling member may include a guide body formed in a hollow pipe shape. The guide body may include a cut part disposed at a side surface of the guide body and extending in a longitudinal direction of the guide body.

The guide body may have an outer diameter that is larger than a diameter of the mounting hole and a diameter of the connection hole.

The fastening member may include: a fastening body fastened to the main housing through the guide body; and a head member connected to the fastening body, and fixed to the motor housing.

The connection hole may be formed in a long-hole shape.

Other features and aspects will be apparent from the following detailed description, the drawings, and the claims.

DETAILED DESCRIPTION OF THE ILLUSTRATED EMBODIMENTS

Hereinafter, a motor device will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
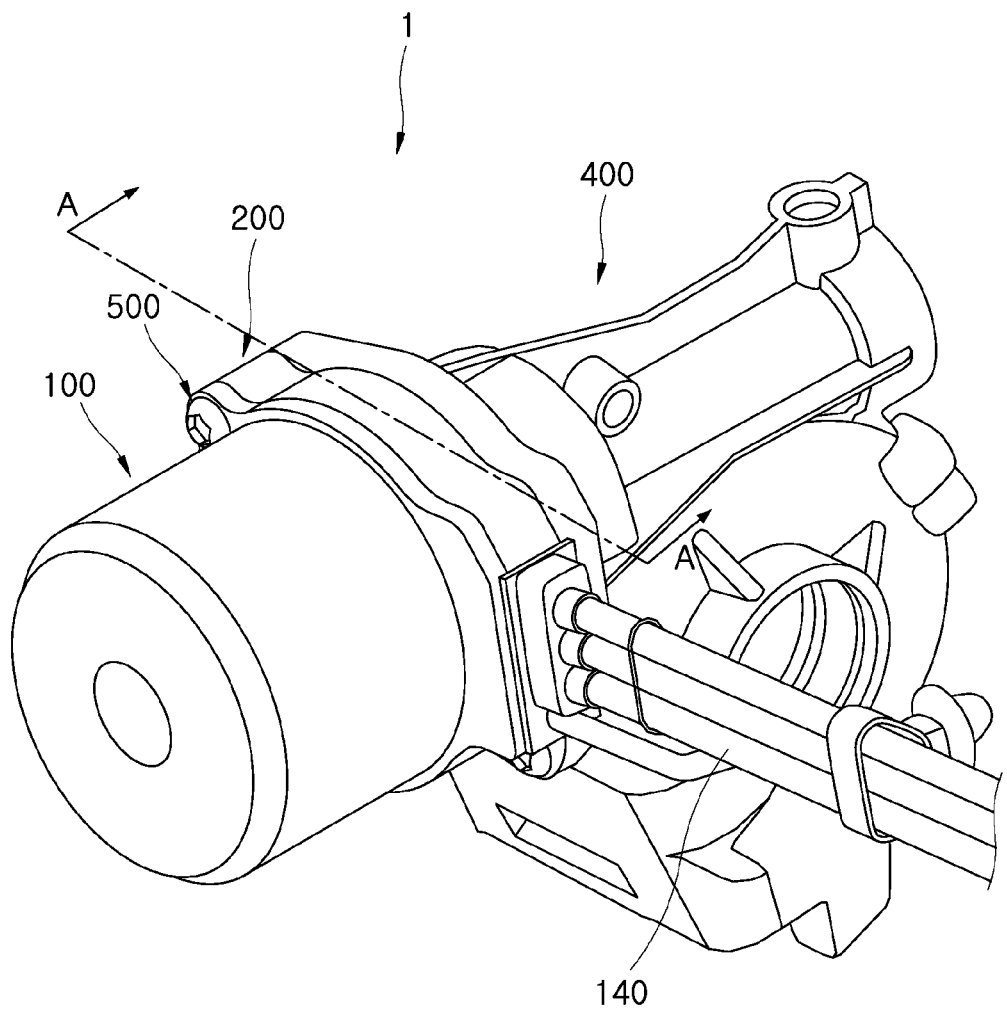
FIG. 1 is a perspective view schematically illustrating a motor device in accordance with an embodiment of the present disclosure.
Figure 2:
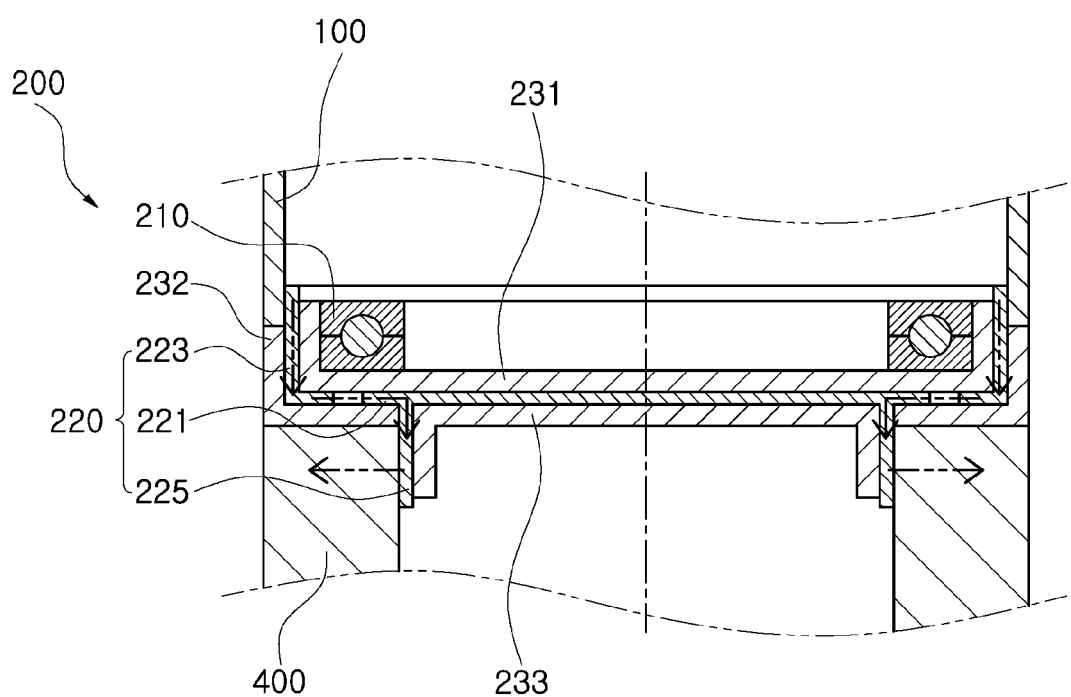
FIG. 2 is a schematic cross-sectional view taken along line A-A of FIG. 1.
Figure 3:
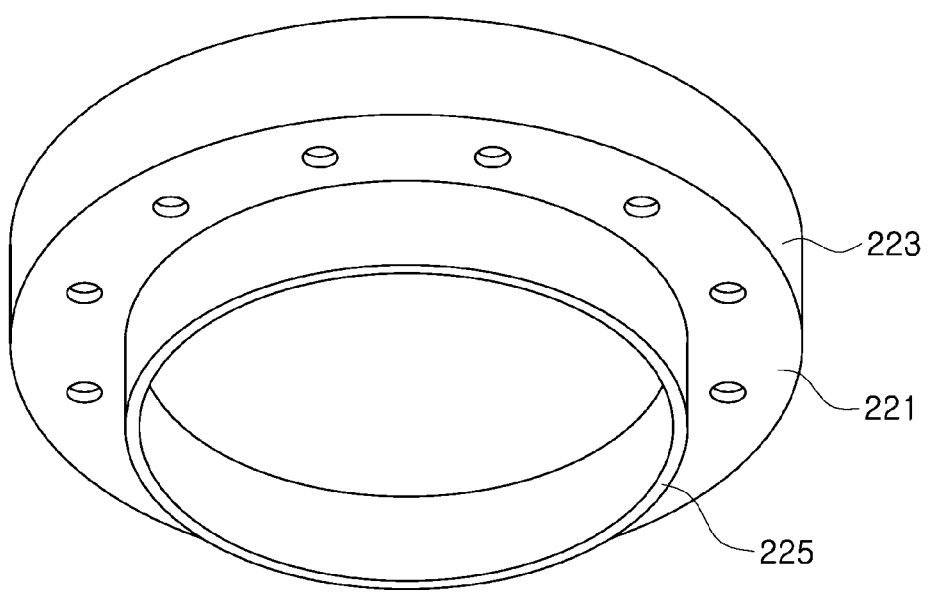
FIG. 3 is a bottom perspective view schematically illustrating a heat radiation part in accordance with the embodiment of the present disclosure.
Figure 4:
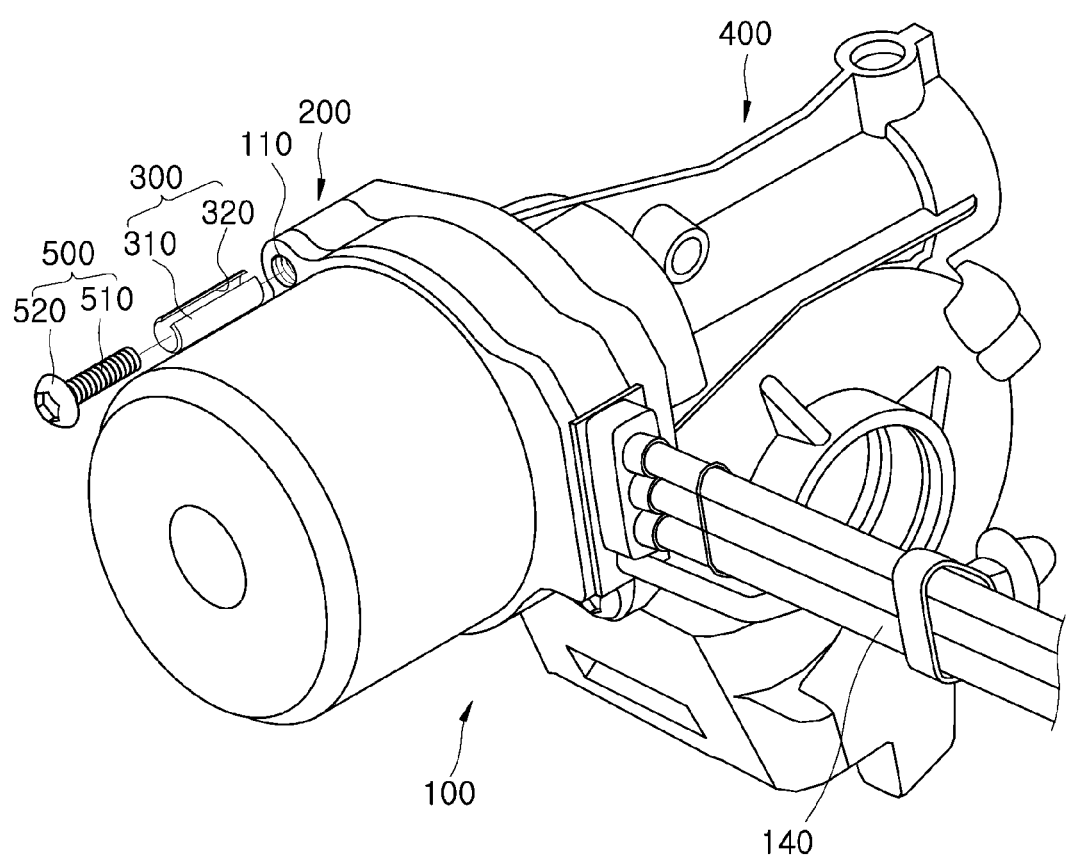
FIG. 4 is a perspective view illustrating that a coupling member and a fastening member are separated from each other in the motor device in accordance with the embodiment of the present disclosure.
Figure 5:
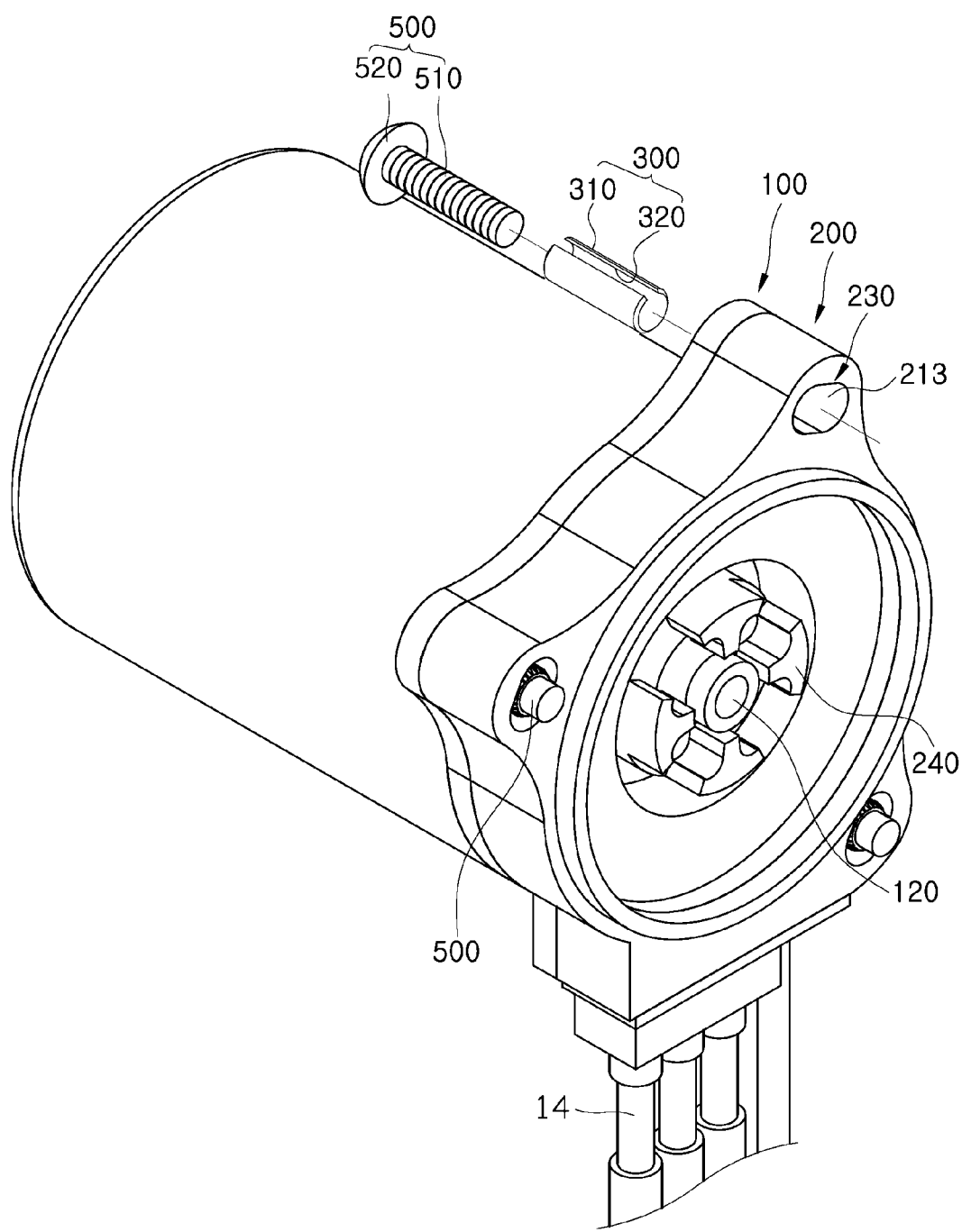
FIG. 5 is a perspective view illustrating that the coupling member and the fastening member in accordance with the embodiment of the present disclosure are separated from a motor housing.
Figure 6:
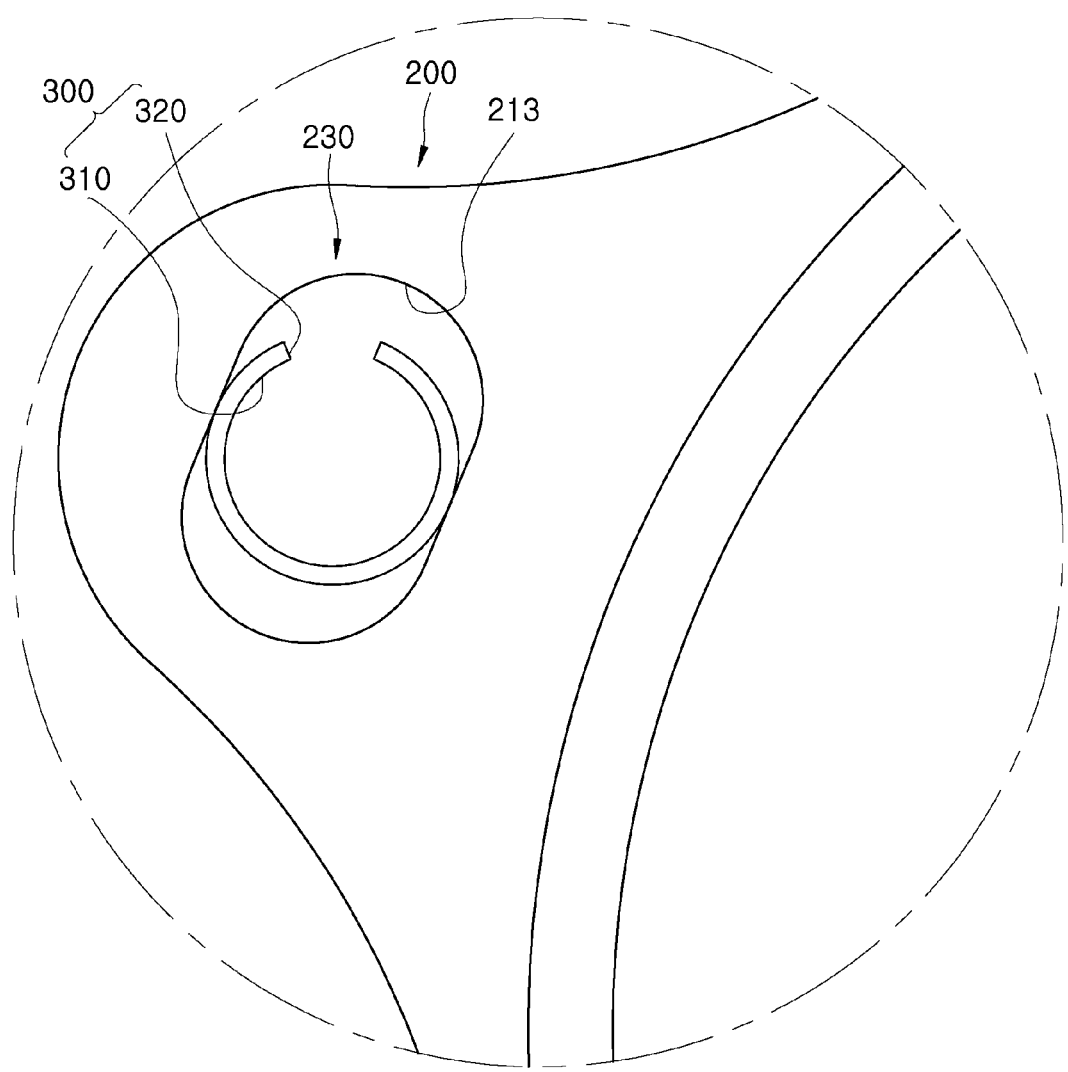
FIG. 6 is a plan view schematically illustrating that the coupling member is located in a connection hole in accordance with the embodiment of the present disclosure.
Figure 7:
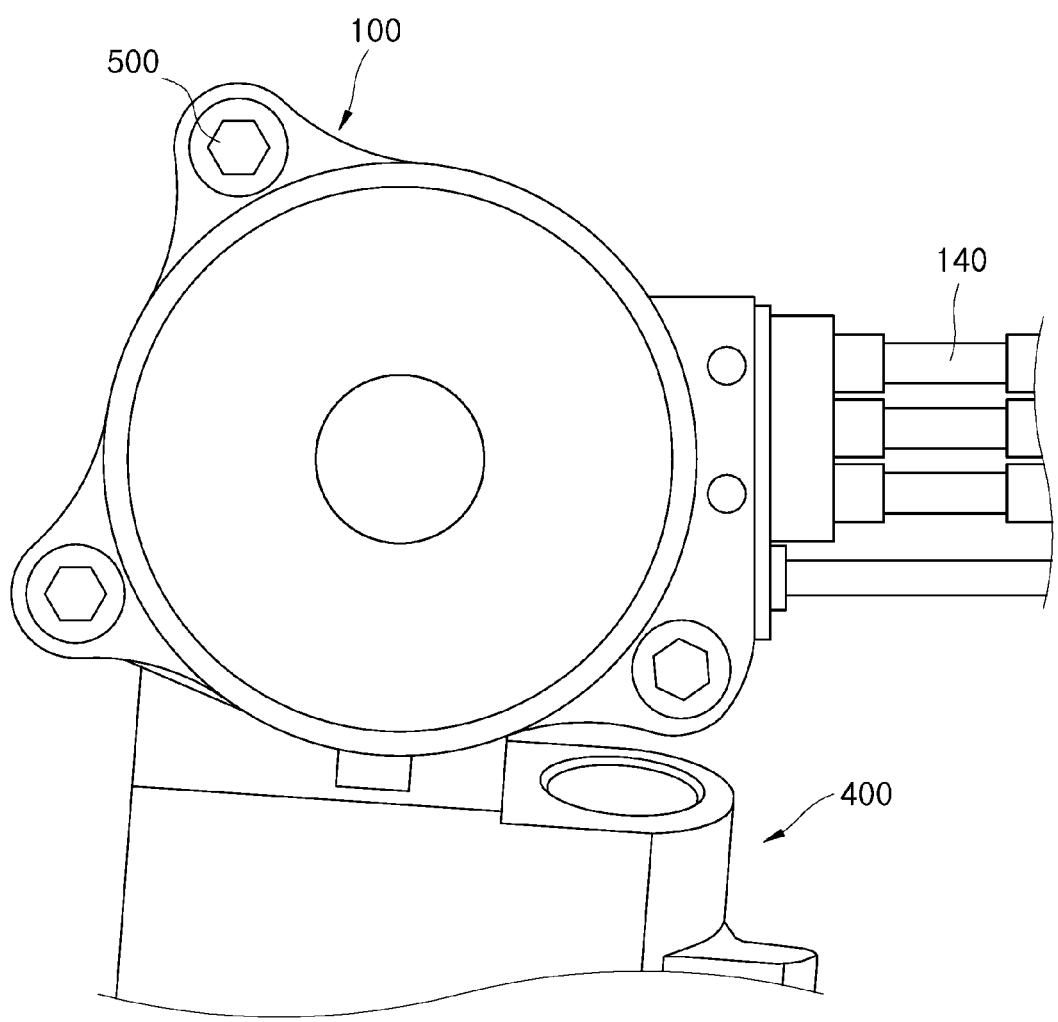
FIG. 7 is a front view of the motor device in accordance with the embodiment of the present disclosure.

FIG. 1 is a perspective view schematically illustrating a motor device in accordance with an embodiment of the present disclosure, FIG. 2 is a schematic cross-sectional view taken along line A-A of FIG. 1, FIG. 3 is a bottom perspective view schematically illustrating a heat radiation part in accordance with the embodiment of the present disclosure, FIG. 4 is a perspective view illustrating that a coupling member and a fastening member are separated from each other in the motor device in accordance with the embodiment of the present disclosure, FIG. 5 is a perspective view illustrating that the coupling member and the fastening member in accordance with the embodiment of the present disclosure are separated from a motor housing, FIG. 6 is a plan view schematically illustrating that the coupling member is located in a connection hole in accordance with the embodiment of the present disclosure, and FIG. 7 is a front view of the motor device in accordance with the embodiment of the present disclosure.

As illustrated in FIGS. 1 to 5, a motor device 1 in accordance with the embodiment of the present disclosure includes a motor housing 100, a motor cover 200 and a coupling member 300.

The motor housing 100 may include a mounting hole 110 and have various shapes, as long as the motor housing 100 is installed to cover the outside of a stator.

The motor housing 100 in accordance with the embodiment of the present disclosure is formed in a cylindrical shape. One side (left side in FIG. 4) of the motor housing 100 is closed, and the motor cover 200 is installed on the other side (right side) of the motor housing 100. The mounting hole 110 is formed along the edge of the motor housing 100 facing the motor cover 200.

The mounting hole 110 may have an inner diameter which is equal to the outer diameter of a guide body 310 of the coupling member 300 or increased/decreased in a preset range, such that the coupling member 300 can be inserted and locked to the mounting hole 110. The mounting hole 110 is formed in a circular shape, and extended in the longitudinal direction of the motor housing 100.

A wire member 140 is extended from one side of the motor housing 100, and the motor device 1 is driven by power supplied through the wire member 140. The wire member 140 includes a power terminal through which power is inputted/outputted.

The motor cover 200 is mounted on the motor housing 100, and has a connection hole 213 to communicate with the mounting hole 110. The motor cover 200 is coupled to the motor housing 100 so as to close the open other side (right side in FIG. 1) of the motor housing 100. The mounting hole 110 is located at the edge of the motor housing 100, and the connection hole 213 communicating with the mounting hole 110 is located at the edge of a mold cover 230 of the motor cover 200.

The connection hole 213 may be formed in a long-hole shape to form a curve in the rotation direction of the motor cover 200, or formed in a long-hole shape extended in the circumferential direction.

Since the connection hole 213 is formed in a long-hole shape, the position of the motor cover 200 may be easily corrected when the motor cover 200 is primarily fixed by the coupling member 300 while abutting on the motor housing 100. The connection hole 213 may be formed in a circular shape.

When the coupling member 300 is located in the connection hole 213, the guide body 310 having a cut part 320 in the coupling member 300 provides an elastic force into the connection hole 213 so as to restrain the movement of the motor cover 200.

Inside the motor cover 200, a coupler 240 is rotatably installed. The coupler 240 is engaged with a gear (not illustrated) installed in a main housing 400, and serves to transfer power.

The motor cover 200 includes a bearing part 210, a heat radiation part 220 and the mold cover 230. The bearing part 210 rotatably supports a motor shaft 120 mounted in the motor housing 100. The bearing part 210 is formed of a metallic material such as steel.

The heat radiation part 220 is disposed outside the bearing part 210, and serves to transfer heat from the motor housing 100 to the main housing 400. The heat radiation part 220 is formed of a metallic material, such as copper, aluminum or steel, which has an excellent heat transfer coefficient. Through the heat radiation part 220, heat of the motor housing 100 may be transferred to the main housing 400, which makes it possible to reduce the occurrence of thermal overload.

The heat radiation part 220 includes a heat radiation body 221, a first protrusion 223 and a second protrusion 225. The heat radiation body 221 is formed in a disk shape whose center is open. The bearing part 210 is disposed on one side (top side in FIG. 2) of the heat radiation body 221. The motor shaft 120 is disposed through the open center of the heat radiation body 221.

The first protrusion 223 protrudes from the heat radiation body 221 toward the motor housing 100, and abuts on the motor housing 100. The second protrusion 225 protrudes from the heat radiation body 221 toward the main housing 400, and abuts on the main housing 400.

The heat of the motor housing 100 is transferred through the first protrusion 223 abutting on the motor housing 100, and heat is transferred to the main housing 400 through the second protrusion 225 abutting on the main housing 400. In FIG. 2, the transfer direction of the heat is indicated by an arrow.

The mold cover 230 is insert-molded, with the bearing part 210 and the heat radiation part 220 housed in the mold cover 230. As the mold cover 230 is insert-molded with the bearing part 210 and the heat radiation part 220 housed in the mold cover 230, the mold cover 230 is integrated with the bearing part 210 and the heat radiation part 220. The mold cover 230 is formed of a plastic material. The connection hole 213 is located at the edge of the mold cover 230.

The bearing part 210 and the heat radiation part 220, which are each formed of a metallic material, are insert-molded with the mold cover 230 formed of a plastic material, thereby forming the motor cover 200. Therefore, a loss of the material is reduced, and a separation process is not required, which makes it possible to reduce the manufacturing cost.

Since the mold cover 230 is formed of a plastic material, the weight of the motor device 1 may be reduced. Furthermore, since the mold cover 230 is formed of a plastic material which is cheaper than aluminum, the manufacturing cost may be reduced.

The mold cover 230 includes a first cover 231, a second cover 232 and a third cover 233. The first cover 231 is disposed between the bearing part 210 and the heat radiation body 221 so as to integrate the bearing part 210 and the heat radiation body 221. The second cover 232 covers the outer surface of the first protrusion 223, and the third cover 233 covers the inner surface of the second protrusion 225.

The coupling member 300 is inserted into the mounting hole 110 and the connection hole 213, and mounted in the mounting hole 110 and the connection hole 213. The coupling member 300 includes the guide body 310 and the cut part 320.

The guide body 310 may be formed of an elastically deformable material.

The guide body 310 is installed in the mounting hole 110 and the connection hole 213, and formed in a hollow pipe shape. The cut part 320 is formed at the side surface of the guide body 310 in the longitudinal direction of the guide body 310. The guide body 310 has an outer diameter larger than the mounting hole 110 and the connection hole 213.

The guide body 310 is compressed and inserted into the mounting hole 110 and the connection hole 213 through the cut part 320, and provides an elastic force into the mounting hole 110 and the connection hole 213, thereby restraining the movement of the motor cover 200.

The motor device 1 in accordance with the embodiment of the present disclosure further includes a fastening member 500. The fastening member 500 is coupled to the main housing 400 through the guide body 310 of the coupling member 300. The fastening member 500 includes a fastening body 510 and a head member 520.

The fastening body 510 is extended from the head member 520, and fastened to the main housing 400 through the inside of the guide body 310. Since the fastening body 510 has a screw thread formed on the outside thereof, the fastening body 510 may be fastened to a screw hole (not illustrated) formed in the main housing 400.

The head member 520 is connected to the fastening body 510, and locked to the motor housing 100. The head member 520 may be rotated by a tool such as a hex wrench or driver, and locked and fixed to the motor housing 100 located outside the mounting hole 110.

Hereafter, the operation state of the motor device 1 in accordance with the embodiment of the present disclosure will be described in detail with reference to the accompanying drawings.

As illustrated in FIGS. 4 and 5, the motor housing 100 and the motor cover 200 are placed so that the mounting hole of the motor housing 100 and the connection hole 213 of the motor cover 200 communicate with each other, and the coupling member 300 is inserted into the mounting hole 110 and moved toward the connection hole 213.

When the coupling member 300 is located in the mounting hole 110 and the connection hole 213, the guide body 310 having a cut portion in the coupling member 300 abuts on the insides of the mounting hole 110 and the connection hole 213, thereby restraining the rotation of the motor cover 200. Since the motor cover 200 can be rotated at a predetermined angle through the connection hole 213 formed in a long-hole shape, the motor cover 200 may be adjusted to raise the precision of a motor position sensor.

The fastening body 510 of the fastening member 500 is fastened to the main housing 400 through the inside of the guide body 310 located in the mounting hole 110 and the connection hole 213. Therefore, since the fastening member 500 is fixed to the main housing 400 through the motor housing 100 and the motor cover 200, the numbers of the fastening members 500 and the connection holes 213, which fix the motor housing 100, the motor cover 200 and the main housing 400, may be reduced to decrease the weight of a product.

As described above, since the fastening member 500 is fastened to the main housing 400 through the coupling member 300 with the coupling member 300 inserted into the mounting hole 110 and the connection hole 213 to fix the motor cover 200 to the motor housing 100, the numbers of the fastening members 500 and the connection holes 213 may be reduced to lower the manufacturing cost.

In the motor device in accordance with the embodiment of the present disclosure, the bearing part 210 and the heat radiation part 220 are insert-molded with the mold cover 230 formed of a plastic material, thereby forming the motor cover 200. Therefore, compared to aluminum casting (die casting), a loss of the material is reduced, and a separate process is not required, which makes it possible to reduce the manufacturing cost.

Furthermore, when the motor cover 200 is manufactured, the dimensional stability is improved, and post processing is not required.

Furthermore, since the fastening member 500 is fastened to the main housing 400 through the coupling member 300 with the coupling member 300 inserted into the mounting hole 110 and the connection hole 213 to fix the motor cover 200 to the motor housing 100, the numbers of the fastening members 500 and the connection holes 213 may be reduced to lower the manufacturing cost.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A motor device comprising:
   a motor housing including a mounting hole;
   a motor cover mounted on the motor housing, and including a connection hole facing the mounting hole;
   a guide body configured to be pressed and inserted into the mounting hole and the connection hole, comprising a cutout formed through a side of the guide body, and mounted in the mounting hole and the connection hole; and
   a fastening member coupled to a main housing through the guide body,
   wherein the cutout extends from end to end in a longitudinally axial direction of the guide body, and a first end of the guide body and a second end of the guide body facing the first end are separated by the cutout.

2. The motor device of claim 1, wherein the motor cover comprises:
   a bearing part configured to rotatably support a motor shaft;
   a heat radiation part disposed outside the bearing part and configured to transfer heat from the motor housing to the main housing; and a mold cover integrated with the bearing part and the heat radiation part.

3. The motor device of claim 2, wherein the mold cover is an injection-molded member.

4. The motor device of claim 2, wherein the bearing part and the heat radiation part are housed in the mold cover.

5. The motor device of claim 2, wherein the mold cover comprises a plurality of cover portions, and the bearing part and the heat radiation part are disposed between the plurality of cover portions.

6. The motor device of claim 2, wherein the bearing part and the heat radiation part are each formed of a metallic material, and
wherein the mold cover is formed of a plastic material.

7. The motor device of claim 6, wherein the heat radiation part comprises:
 a heat radiation body having a disk shape of which a center is open;
 a first protrusion protruding from the heat radiation body toward the motor housing, and abutting the motor housing; and
 a second protrusion protruding from the heat radiation body toward the main housing, and abutting the main housing.

8. The motor device of claim 7, wherein the mold cover comprises:
 a first cover disposed between the bearing part and the heat radiation body so as to integrate the bearing part and the heat radiation body;
 a second cover configured to cover an outer surface of the first protrusion; and
 a third cover configured to cover an inner surface of the second protrusion.

9. The motor device of claim 2, wherein the mounting hole is located at an edge of the motor housing, and
wherein the connection hole is located at an edge of the mold cover.

10. The motor device of claim 9, wherein the guide body is formed in a hollow pipe shape, and
wherein the cutout extends in a longitudinal direction of the guide body.

11. The motor device of claim 10, wherein the guide body has an outer diameter larger than a diameter of the mounting hole and a diameter of the connection hole.

12. The motor device of claim 11, wherein the fastening member comprises:
 a fastening body fastened to the main housing through the guide body; and
 a head member connected to the fastening body, and fixed to the motor housing.

13. The motor device of claim 10, wherein the connection hole is formed in a long-hole shape.

14. A motor device comprising:
 a motor housing including a mounting hole;
 a motor cover mounted on the motor housing, and including a connection hole facing the mounting hole;
 a guide body configured to be pressed and inserted into the mounting hole and the connection hole, comprising a cutout formed through a side of the guide body, and abutting on insides of the mounting hole and the connection hole to restrain rotation of the motor cover; and
 a fastening member coupled to a main housing through the guide body,
wherein the cutout extends from end to end in a longitudinally axial direction of the guide body, and a first end of the guide body and a second end of the guide body facing the first end are separated by the cutout.

* * * * *